United States Patent [19]

Ygnard

[11] 4,238,007
[45] Dec. 9, 1980

[54] BRAKE HAVING A RING-LIKE BRAKING MEMBER

[75] Inventor: Michel C. M. Ygnard, Ermont, France

[73] Assignee: Societe Anonyme Francaise du Ferodo, Paris, France

[21] Appl. No.: 92,833

[22] Filed: Nov. 9, 1979

Related U.S. Application Data

[63] Continuation of Ser. No. 926,731, Jul. 21, 1978, abandoned.

[30] Foreign Application Priority Data

Jul. 29, 1977 [FR] France ................................ 77 23394

[51] Int. Cl.³ ............................................. F16D 53/00
[52] U.S. Cl. .......................................... 188/76; 192/73
[58] Field of Search ..................... 188/73.3, 76; 192/73

[56] References Cited

U.S. PATENT DOCUMENTS

| 3,357,525 | 12/1967 | Francois | 188/76 |
| 3,612,226 | 10/1971 | Pauwels | 188/73.3 |

FOREIGN PATENT DOCUMENTS

| 2311964 | 12/1976 | France | 188/76 |
| 4536167 | 3/1965 | Japan | 188/73.3 |

Primary Examiner—George E. A. Halvosa
Attorney, Agent, or Firm—Charles E. Brown

[57] ABSTRACT

The invention relates to a brake which is particularly suited to vehicles, and whose brake member is in the shape of a ring having axially-extending braking surfaces on the inner and outer surfaces thereof, and whose fixed support comprises two side members arranged on both sides of a generally C-shaped control member. According to the invention, these side members are coupled circumferentially to one another within the ring by a connecting bar whose circumferential ends are radially connected to the side members at the level of the regions thereof against which the inner brake pad can be brought to bear.

4 Claims, 5 Drawing Figures

BRAKE HAVING A RING-LIKE BRAKING MEMBER

This is a continuation of application Ser. No. 926,731 filed July 21, 1978, now abandoned.

BACKGROUND OF THE INVENTION

The present invention relates in general to so-called "ring" brakes, that is to say brakes whose rotating brake member comprises an axially-extending cylindrical drum or ring having braking surfaces formed respectively on the inner and outer surfaces of the ring. Such brakes are also known as "internal-external shoe drum brakes". A brake of this kind comprises a fixed support designed to be secured to some suitable support member, for example a wheel axle, on the shaft of which is mounted the corresponding ring, two brake pads arranged on both sides of this ring, and control means adapted to act on the said brake pads so as to apply the latter to both sides of the said ring in a direction that is overall radial to this ring, termed hereinafter the pressure or clamping axis, and which passes through the central region of each of the brake pads.

The present invention relates more particularly to the case where the fixed support comprises two side members arranged on both sides of an axial plane of the brake containing the pressure axis, and adapted to retain circumferentially the brake pads during braking.

In practice, both brake pads are at least partially enclosed by the side members of the fixed support, or by other elements of the latter integral with said side members, in such a way that, during braking and because of the fact that they tend to be subjected to a circumferential force when they are applied to the brake ring, they both circumferentially contact that one of the said side members which, in the direction of rotation of the said ring, is "downstream" hereinafter termed the "down" side member.

Thus, such a down side member is usually the only one which is subject to the braking force.

In order to subject also the "upstream" side member of the fixed support to the braking force, it has been proposed to couple circumferentially the two side members, i.e. the up and down side members of the fixed support, by one or a plurality of connecting bars.

With connecting bars situated within the ring, these are usually radially disposed at a distance from the regions of the side members of the fixed support against which the circumferential ends of the brake pad can come into contact which, also being located within the interior of the ring, is associated with the internal face of the latter. There is thus a radial displacement between the region of a side member involved in absorbing the braking force due to such an internal pad, and the region of the same side member by which the latter is, for reinforcement purposes, coupled to the other member by the connecting bar.

The object of the present invention is generally a ring-type brake of the type briefly described above, in which measures are adopted to provide a better adaptation of the connecting bar circumferentially coupling the side members of the fixed support in the interior of the ring, to the forces that the said connecting bar has to transmit.

SUMMARY

According to the invention, this brake is characterised in that the circumferential ends of the connecting bar by which the latter is joined to the side members that it connects are radially disposed substantially at the level of the regions of the said side members against which the circumferential ends of the internal brake pad can bear.

This connecting bar is thus mounted close to the region of the side members against which are applied the forces that it has to transmit.

By virtue of such a mounting, the efficiency of the connecting bar of the brake according to the invention is advantageously reinforced in such a way that, other conditions being equal, this connecting bar may advantageously be of appropriately small dimensions.

The result is a saving in material, a decrease in weight, and an improvement in the manufacturing conditions.

Moreover, in a projection on a plane perpendicular to the axis of the ring, this connecting bar preferably has, at least at each of its circumferential ends, a contour which, seen from the corresponding side member, extends overall circularly and is concentric with that of the ring.

By virtue of such a contour and the fact that the connecting rod is mounted close to the region of the side members of the fixed support involved in absorbing a braking force, and thus close to the ring, the connecting bar of the brake according to the invention advantageously helps to reduce the radial volume of the brake, which can thereby facilitate its installation at least for certain applications, particularly for example in the case of the front axle assembly of a vehicle.

Between the circumferential ends of the connecting bar, the contour of the bar may be of any shape and may be for example generally rectilinear in projection on a plane perpendicular to the axis of the ring.

However, the entire contour is preferably circular and concentric with that of the ring.

This arrangement is in harmony with the arrangement in which a second connecting bar is provided between one of the side members of the fixed support and the other on the outside of the ring, this second connecting bar also having a contour which, in projection on a plane perpendicular to the axis of the ring, extends overall circularly and is concentric with that of the said ring.

In fact, the two connecting bars employed both have in this case concentric contours, in projection on the plane in question, which advantageously facilitates the manufacture of the corresponding fixed support, particularly when the latter is cast.

DESCRIPTION OF THE PREFERRED EMBODIMENTS

Figure 1:
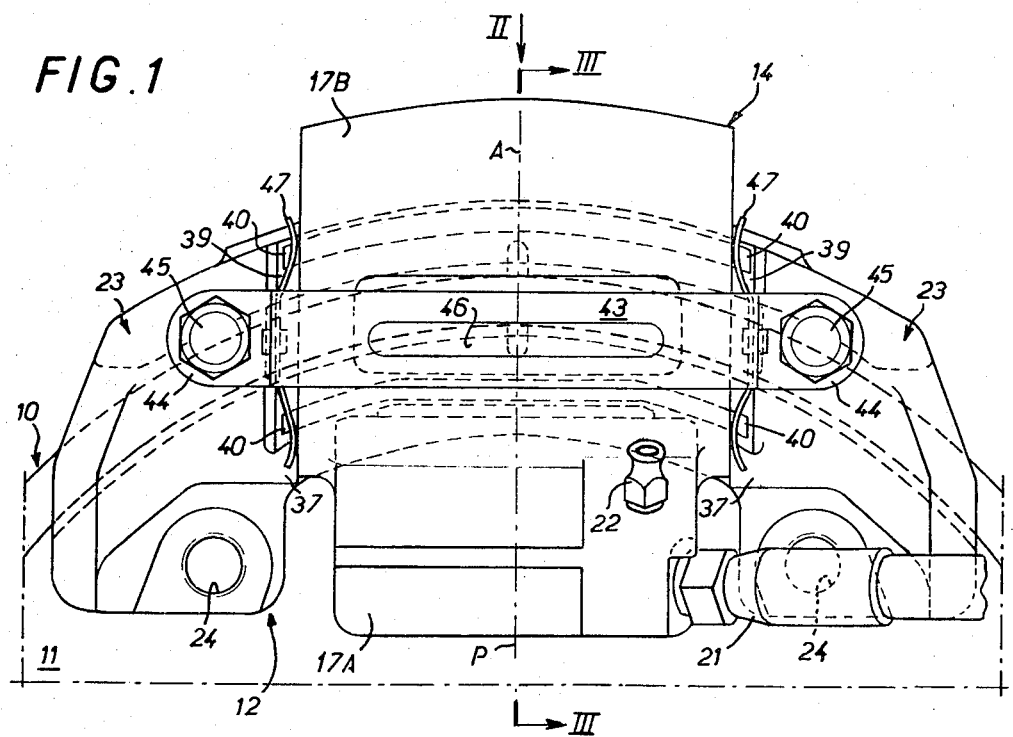
FIG. 1 is a partial elevation of a ring brake according to the invention.

In these figures a ring-type brake will be recognised that is to say a brake whose rotating braking member 10 has overall the shape of an axially-extending cylindrical ring or drum 10, this ring being mounted on a cheek 11 by means of which it may be secured to the brake axle (not shown). The brake is for example a brake for use in vehicles.

The brake comprises in a manner known per se a fixed support 12, two brake pads 13A, 13B arranged on both sides of the ring 10, the first for co-operating with the internal braking surface of the latter and the second for co-operating with the external braking surface of the ring, and a control or clamping member 14, designed to act on the brake pads 13A, 13B to apply the latter to the ring 10 in an overall radial direction A with respect thereto, hereinafter termed the pressure axis, which passes through the central region of each of the brake pads.

Figure 2:
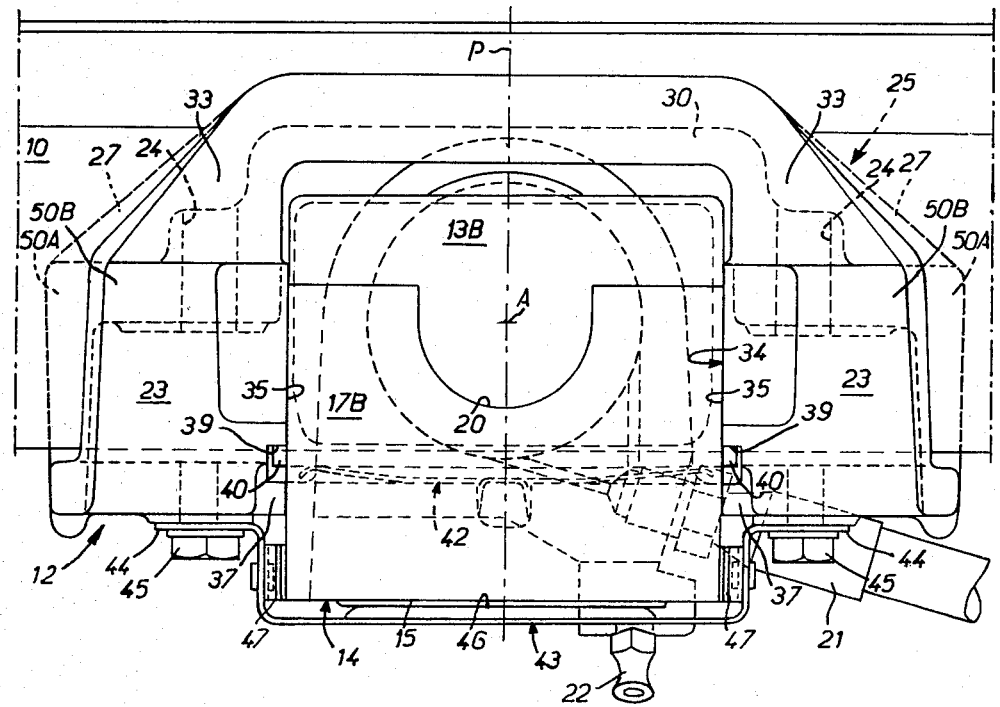
FIG. 2 is a partial plan view of this brake along the arrow II of FIG. 1.
Figure 3:
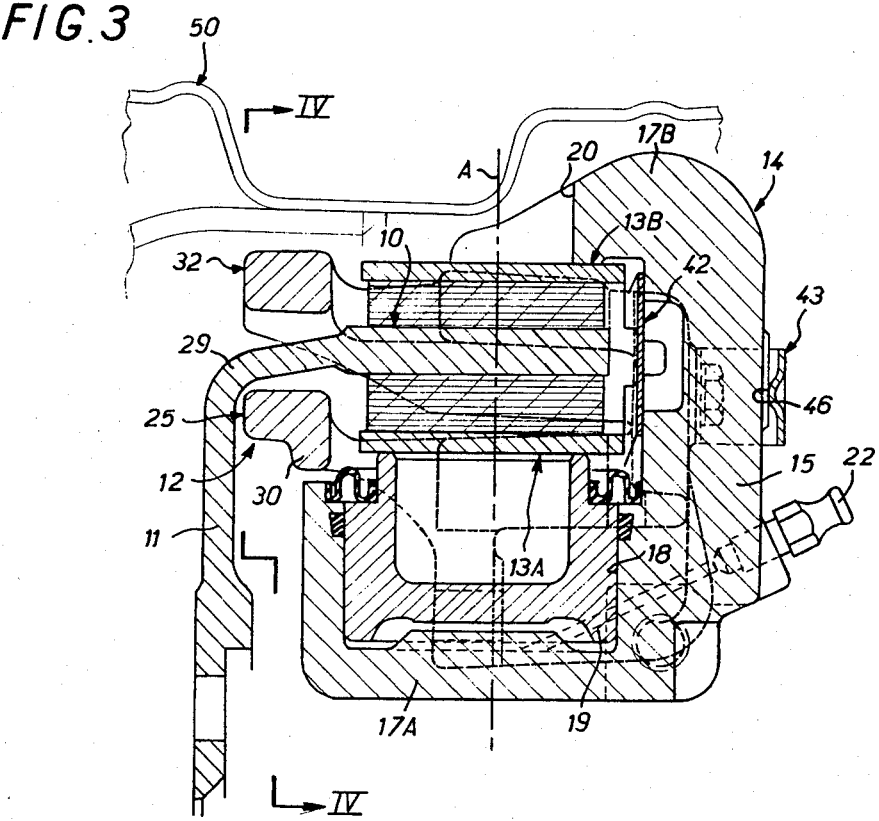
FIG. 3 is a partial axial section along the line III—III of FIG. 2.
Figure 4:
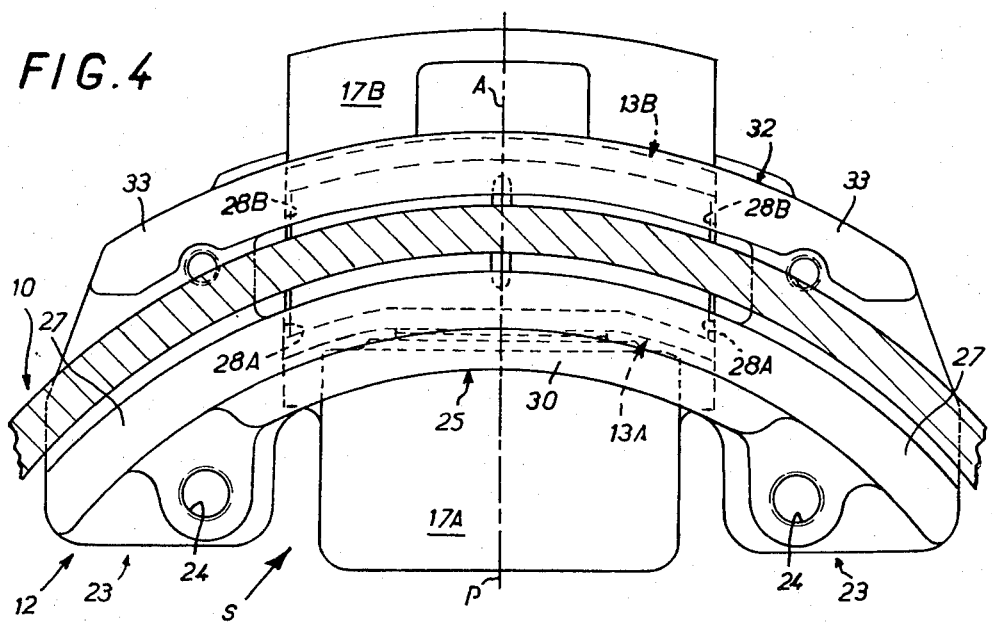
FIG. 4 is a partial elevation section along the line IV—IV of FIG. 3.

This pressure axis A is indicated by the chain-dotted lines in FIGS. 1, 3 and 4, and by its trace in FIG. 2.

In practice, and in a manner known per se, the clamping member 14 is generally C-shaped and extends radially on both sides of the ring 10 and brake pads 13A, 13B; to this end, it comprises on both sides of a central part 15 radially connecting the brake pads, a first flange 17A, which is recessed to provide a bore 18 forming a cylinder for a piston 19 by means of which it can act on the brake pad 13A, and a second flange 17B, whose end has a notch therein indicated at 20 in the example shown, and by which it can act on the brake pad 13B.

At the rear of the piston 19 the cylinder 18 communicates with a feed nozzle 21 by which it can be connected to any suitable source of pressurised fluid (not shown), as well as to a purge nozzle 22.

In a manner also known per se, the fixed support 12 includes, in the embodiment shown, an axial plane of symmetry P passing through the pressure axis A.

This axial plane of symmetry, hereinafter called an axial pressure plane, is represented by its trace (dotted line) on FIGS. 1, 2 and 4.

In the embodiment illustrated, the fixed support 12 comprises two side members 23 arranged symmetrically on both sides of the pressure plane P, each of which flanks the ring with a degree of clearance, and whose ends that are radially innermost with respect to the ring form two lugs each having a hole 24 and adapted to be fixed to any appropriate support member (not shown).

These side members 23 are coupled circumferentially to one another, within the interior of the ring 10, by a connecting bar 25 which follows the outline of the flange 17A of the clamping member 14, on the side of the cheek 11 carrying the ring.

Figure 5:
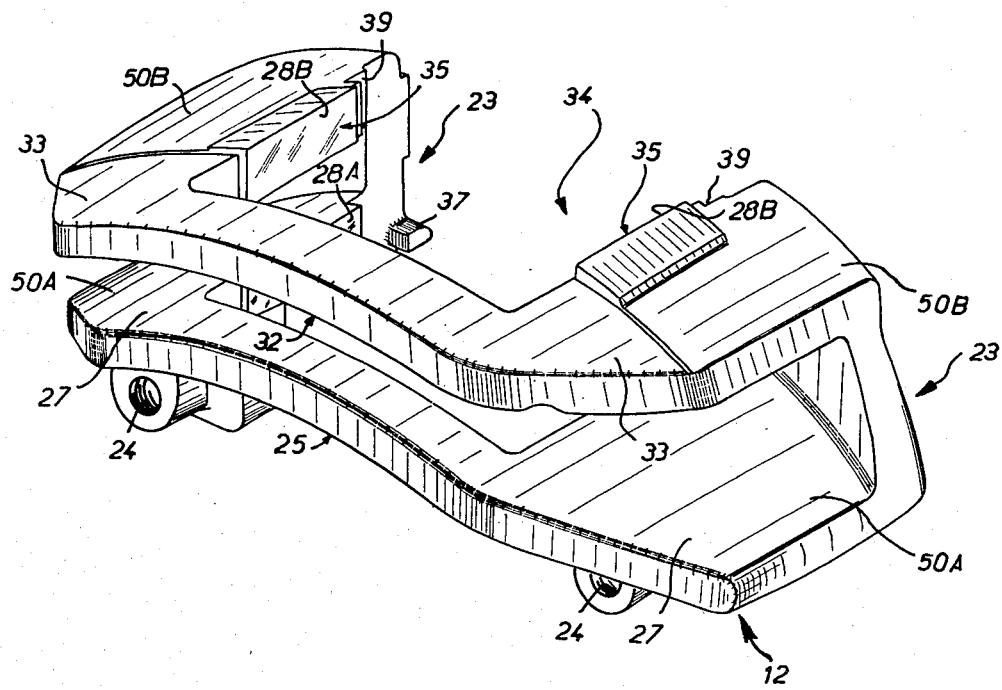
FIG. 5 is a perspective view of the fixed support itself employed in the brake according to the invention.

In accordance with the invention, the circumferential ends 27 of this connecting bar 25 by which the latter is joined to the side members 23 are radially disposed approximately at the level of the regions 28A of the said side members against which the circumferential ends of the internal brake pad 13A can be brought to bear (FIGS. 4 and 5).

In conjunction with this, in a projection on a plane which, such as the plane of FIG. 4, is perpendicular to the axis of the ring 10, the connecting bar 25 according to the invention has, at least at each of its circumferential ends 27, and in practice, in the example illustrated, from one of its circumferential ends to the other, a contour which, having regard to the side members 23, extends overall circularly and is concentric with the contour of the ring 10 (FIG. 4).

The result of these provisions is that, as can be seen in particular in FIGS. 3 and 4, the connecting bar 25 follows overall the contour of the ring 10, in the immediate proximity of the curved region 29 of the cheek 11 carrying this ring by which the bar is connected to cheek 11.

Side members 23 intersecting with the circumferential ends 27 of the connecting bar 25 define a circular segment as being the space S. The two fastening lugs each is disposed within the confines of the space S of the circular segment.

In practice, in a projection on a plane which, such as the plane of FIG. 2, is perpendicular to the pressure axis A, the connecting bar 25 generally has a handle-shaped contour.

In practice also, this connecting bar is reinforced on its lower face, that is to say on the face radially closest to the axis of the ring 10, by a rib 30 that extends from one of the side members 23 of the fixed support to the other.

On the outside of the ring 10, the side members 23 of the fixed support 12 are also coupled circumferentially to one another by a second connecting bar 32.

This connecting bar 32 extends axially on the same side as the connecting bar 25 and, like the latter, has in projection on a plane perpendicular to the axis of the ring, a contour that is overall circular and concentric with that of this ring, and, in projection on a plane perpendicular to the pressure axis A, a generally handle-shaped contour.

Like the connecting bar 25, the connecting bar 32 is also located in the immediate proximity of the ring 10, in such a way that its circumferential ends, by which it is linked to the side members that it connects, are radially disposed approximately at the level of the regions 28B of these side members against which the circumferential ends of the outer brake pad, that is to say the brake pad 13B intended to co-operate with the outer face of the ring 10, can be brought to bear.

In practice, the two connecting bars 25 and 32, which are overall concentric, are continuous and in one piece with the fixed support 12, and are for example fabricated in a single piece by casting.

In addition, each side member 23 comprises two overall parallel flanges 50A, 50B, FIG. 5, with which it encloses the ring 10.

It is on the sections of these flanges that are formed the regions 28A and 28B of the said side members against which the brake pads 13A and 13B respectively will bear.

The circumferential ends 27 of the connecting bar 25 are overall in the axial extension of the flanges 50A of the side members 23 and, in a similar way, the circumferential ends 33 of the connecting bar 32 are overall in the axial extension of the flanges 50B of the said side members.

The side members 23 of the fixed support 12 form, between themselves, a central radial cavity 34 which accommodates the clamping member 14.

The side members 23 of the fixed support 12 ensure the radial guidance of the clamping member 14 by means of their opposite faces 35 that define this cavity, and which are parallel to the axial pressure plane P on both sides of the latter, as well as by means of the oppositely located projecting stop means 37, at the level of that of their faces which is most remote from the cheek 11 carrying the ring 10: the flanges 17A, 17B slidably engage between the said opposite faces 35 of the side members 23, and the central part 15 of the clamping member slidably engages with the opposite faces of the stop means 37 of these side members which, in the example illustrated, are each coplanar with the faces 35 of the said side members.

The faces 35 of the side members 23 also serve as a radial guide and as a circumferential bearing for the brake pads 13A, 13B, and in practice they are formed from the regions or small faces 28A, 28B mentioned above.

Shoulder portions 39 of the side members 23, which are perpendicular to the axial pressure plane P and form an extension of the side members, serve as axial thrust faces for the brake pads 13A, 13B, the latter having lateral circumferential extensions 40 that bear against these shoulder portions.

The brake pads 13A, 13B are biassed in the direction of the shoulder portions 39 by a leaf spring 42 which bears against the centre part 15 of the clamping member 14, on the face of the latter facing the portion of the ring 10.

At the same time, this leaf spring 42 axially urges the clamping member 14 so as to bear against a retaining bar 43 which extends roughly perpendicularly to the axial pressure plane P, on the side of the face of the centre part 15 of this clamping member 14 furthest from the ring 10, and which has lateral flanges 44 by means of which, with the aid of a screw 45, it is made integral with the side members 23 of the fixed support 12.

For contact with the clamping member 14, the retaining bar 43 has a longitudinal rounded boss 46, formed for example by casting, and such as illustrated in the figure.

The lateral flanges 44 of the retaining bar 43 each carry leaf springs 47 that bear against the side faces of the centre part 15 of the clamping member 14 in order to provide a good stabilisation of the latter.

The operation of such a brake is well-known: when pressurised fluid is passed into the bore forming the cylinder 18, the piston 19 forces the brake pad 13A against the ring 10, and the clamping member 14 transmits the corresponding force to the brake pad 13B which is thus also urged against the ring 10; the latter is thus braked.

When the fluid pressure is released, the ring is disengaged.

During such an operation, the clamping member 14 is allowed to move radially, being guided in such a movement both by the side members 23 of the fixed support 12 and by the retaining bar 43; moreover, by virtue of the rounded contact surface of the rim 46 of the latter, it is able to pivot, if necessary, in order for example to follow any possible conical deformation or distortion in the ring 10.

As will be noted, the connecting bars 25 and 32 leave entirely free the central cavity 34 formed therebetween by the side members 23 of the fixed support, which on the one hand facilitates the machining of the latter, which may be effected by a single radial broaching cut, and which on the other hand facilitates the positioning and mounting of the clamping member 14.

As will also be noted, the radial bulk of the brake is particularly reduced, which facilitates its installation, particularly in the case where, such as illustrated by the fine lines in FIG. 3, the rim 50 of the respective wheel leaves only a small space between itself and the ring for the insertion of the brake assembly.

The present invention is not restricted to the embodiment described and illustrated, but covers all variants within the scope of the appended claims, in particular as regards the control means employed, which are not necessarily fabricated from a C-shaped piece common to the two brake pads and mounted radially in a floating manner, but which, on the contrary, may for example comprise different specific means for each of the said brake pads and be connected to the fixed support.

Moreover, in its centre part at least, that is to say between its circumferential ends 27, the connecting bar 25 need not necessarily have a circular contour; on the contrary, this contour may be rectilinear in projection on a plane perpendicular to the axis of the ring.

I claim:

1. A brake of the type comprising a fixed support, a rotatable brake member in the overall form of a cylindrical ring, inner and outer brake pads respectively disposed on radially inner and outer sides of said brake member, a clamping member straddling said brake member and said brake pads, control means mounted in said clamping member for applying said brake pads in conjunction with said clamping member simultaneously against said brake member along a pressure axis in a radial direction relative to said ring brake member passing through central regions of said brake pads, said fixed support comprising two side members each disposed on both sides of an axial plane of said brake containing said pressure axis, means on said side members for circumferentially retaining said brake pads, and wherein the improvement comprises a part-cylindrical connecting bar integrally formed with and joining said side members inside said brake member, and said connecting bar having circumferential ends joining said connecting bar to said side members and being disposed substantially in alignment with said means on said side members for circumferentially retaining the corresponding inner brake pad, fastening lugs for fixing said fixed support, said fastening lugs extending generally parallel to the axis of said cylindrical ring brake member along the radially inner side of said part-cylindrical connecting bar, said fastening lugs being disposed, when viewed in parallel to the axis of said cylindrical ring brake member, generally within the confines of the space of a circular segment defined between the circumferential ends of the radially inner side of said part-cylindrical connecting bar and said bar.

2. A brake according to claim 1, wherein said support is U-shaped in a plane normal to said pressure axis.

3. A brake of the type comprising a fixed support, a rotatable brake member in the overall form of a cylindrical ring, inner and outer brake pads respectively disposed on radially inner and outer sides of said brake member, a clamping member straddling said brake member and said brake pads, control means mounted in said clamping member for applying said brake pads in conjunction with said clamping member simultaneously against said brake member along a pressure axis in a radial direction relative to said brake member passing through central regions of said brake pads, said fixed support comprising two side members each disposed on both sides of an axial plane of said brake containing said pressure axis, means on said side members for circumferentially retaining said brake pads, and wherein the improvement comprises inner and outer connecting bars integrally formed with and joining said side members respectively radially inside and outside of said brake member, said connecting bars having circumferential spaced ends joined to parts of said side members which are disposed substantially in alignment with said means on said side members for circumferentially retaining their corresponding brake pads, said connecting bars and adjoining portions of said side members being radially spaced apart and of generally part-cylindrical configurations substantially coaxial to each other, said connecting bars having similar handle-shaped contours when projected on a plane perpendicular to the axis of said brake, fastening lugs for fixing said fixed support, said fastening lugs extending generally parallel to the axis of said cylindrical ring brake member along the radially inner side of said inner part cylindrical connecting bar, said fastening lugs being disposed, when viewed in parallel to the axis of the said cylindrical ring brake member, generally within the confines of the space of a circular segment defined between the circumferential ends of the radially inner side of said inner part-cylindrical connecting bar and said bar.

4. A brake according to claim 3 wherein said support is U-shaped in a plane normal to said pressure axis.

* * * * *